United States Patent Office.

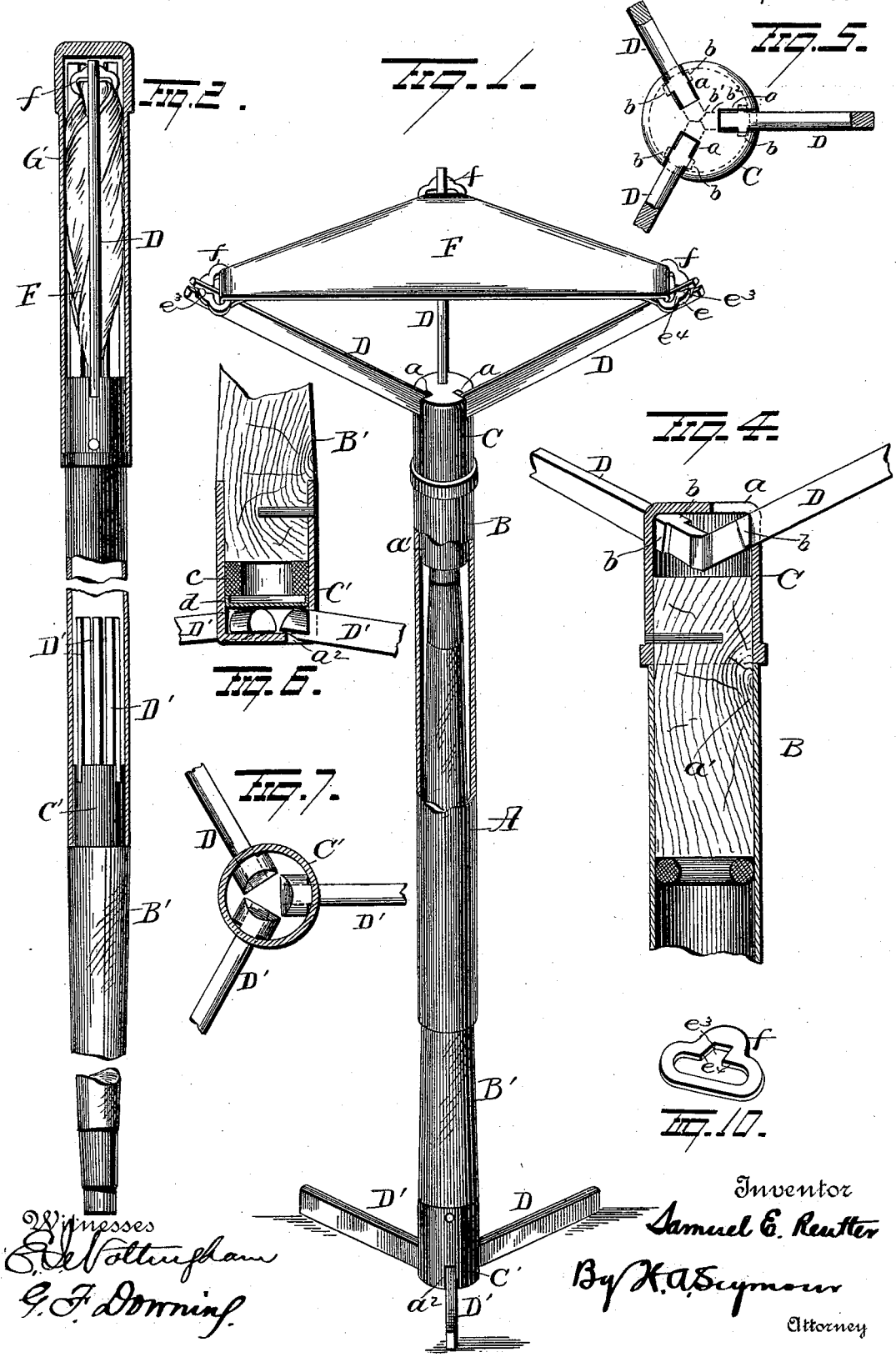

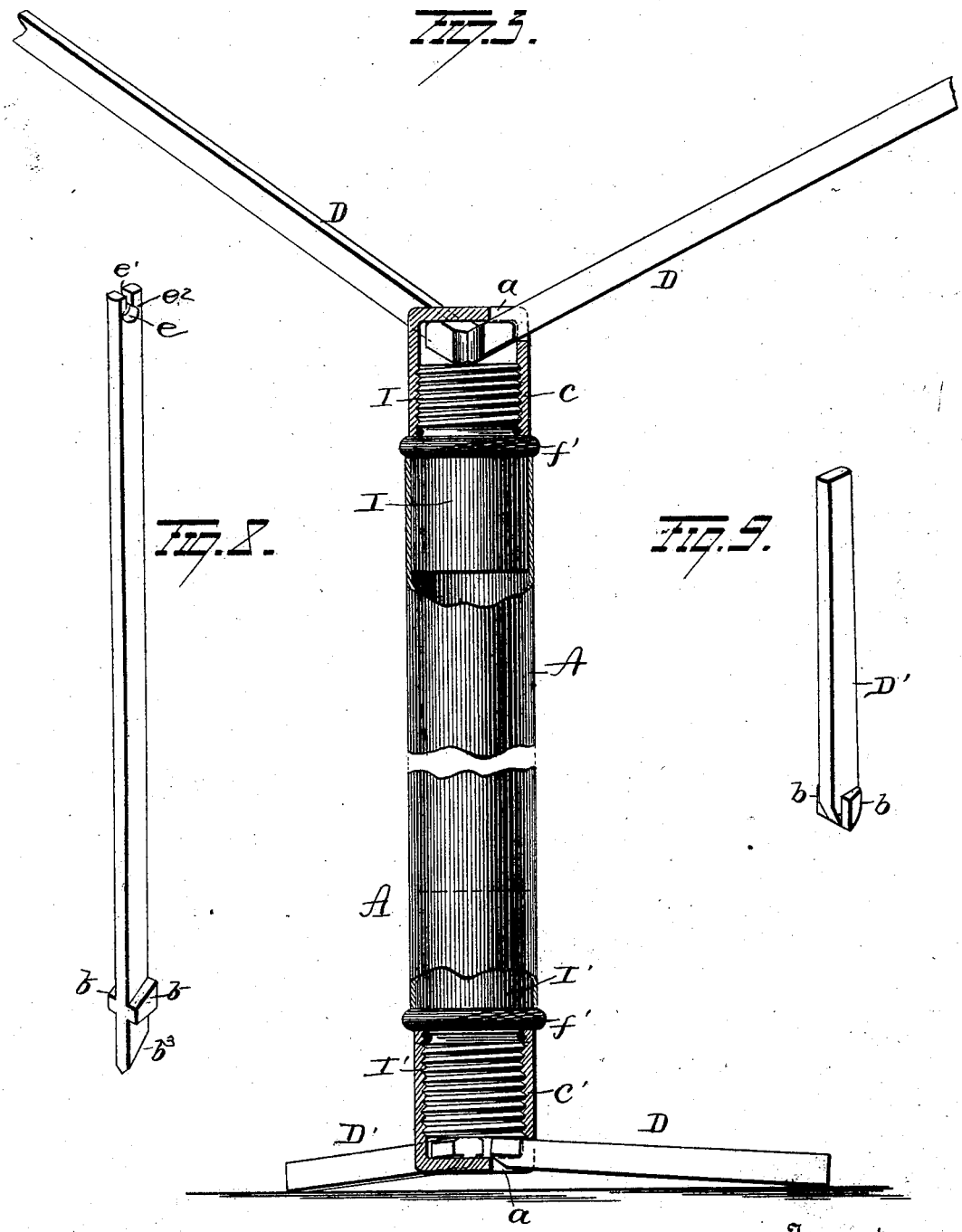

SAMUEL E. REUTTER, OF WORCESTER, MASSACHUSETTS.

FOLDING CAMP-STOOL.

SPECIFICATION forming part of Letters Patent No. 506,255, dated October 10, 1893.

Application filed January 14, 1893. Serial No. 458,386. (No model.)

*To all whom it may concern:*

Be it known that I, SAMUEL E. REUTTER, of Worcester, in the county of Worcester and State of Massachusetts, have invented certain new and useful Improvements in Folding Camp-Stools; and I do hereby declare the following to be a full, clear, and exact description of the invention, such as will enable others skilled in the art to which it appertains to make and use the same.

My invention relates to an improvement in folding camp stools, the object being to construct a strong and portable device, which will admit of its being folded into small compass and when folded will present a neat and finished appearance.

With this object in view my invention consists in certain novel features of construction and combinations of parts as will be hereinafter more fully described and pointed out in the claims.

In the accompanying drawings, Figure 1 is a view in perspective taken partly in section of my preferred form of camp stool. Fig. 2 is a longitudinal section of the same in its folded position. Fig. 3 is a perspective view partly in section of another form of my improvement, in its open position, and Figs. 4, 5, 6, 7, 8, 9 and 10 are detached views.

A represents a stem or standard, made up of two tapering sections B B', the former being hollow while the latter is solid and preferably made of wood, and C C' are sockets secured to the larger ends respectively of said sections. Socket C projects a slight distance beyond the end of section B and is secured in place by rivets or securing devices which latter pass through the socket and section B and into a block of wood or other yielding material $a'$, which latter is secured within section B and projects a slight distance into the same. Sleeve C or socket C' is fitted on the larger end of section B' and is rigidly held thereon by rivets or other suitable means. Socket C is provided with a series of slots $a$ through which the tines D extend. These tines are of such length that when spread out they will project radially from the stem or standard a sufficient distance to form the frame work of a seat. The outer ends of the tines are inserted into the socket and passed through the slots $a$ formed in its end. The inner end of each one of the tines D is provided with two laterally projecting shoulders $b$, which serve as end bearings for the tines, said shoulders fitting against the bottom and sides of the socket adjacent to the slots $a$, and being of greater width than the latter prevent the tines from being withdrawn laterally from the socket. The inner end of each one of the tines D, is beveled as at $b'$ $b^2$ on its opposite sides and undercut or beveled as at $b^3$. By means of this construction when the tines are spread apart, the beveled ends interlock as represented in Fig. 5 and form a keystone which serves to securely lock the tines together and form a firm inner support for each one of them. The shoulders $b$ constitute a fulcrum for each tine and hence the latter when spread to form a seat are firmly braced in an inclined position suitable to constitute a seat frame. Socket or sleeve B' is provided with a series of slots $a^2$ through which project the tines D' which when unfolded and caused to project laterally from the stem or standard form an extended base or support.

Tines D' are held in their open position by means of a rubber disk $c$, which latter bears against a metal washer $d$ which in turn presses against the heads of the tines and holds them in their normal position. The tines D' are also held in their closed position by the spring action of the rubber disk $c$.

To open or spread the tines to their operative position to form the base for the stool, their free ends are forced outwardly until they assume their open position which can be inclined or horizontal as desired. As the tines are being opened, the inner ends thereof bearing on the washer, causes the rubber disk against which the washer rests to yield, or in other words to follow the movements of the inner ends of the tines and thus always exert a yielding pressure on their inner ends which when the tines are open tends to keep them in that position and when closed tends to keep them closed.

The upper or larger section of the stem B is made hollow and is open at its lower end, which latter is adapted to receive the smaller end of the section B' of the stem. The larger end of section B' of the stem A is provided with the tines D', which when folded out as previously described forms the base of the stool. The upper section B of the stem resting loosely on the lower section B', is free to turn thereon, so that the user of the stool can turn in any direction without rising from his seat and without lifting the tines D' from the ground or floor. To fold the stool, it is simply necessary to withdraw the upper section B from the lower section B', fold up the tines D' and then insert the larger end of section B' into the smaller open end of section B. The tines D carrying the seat are then folded to an upright position with the canvas seat F between them, and are covered by the hollow sleeve G, the open end of which is adapted to snugly fit the larger end of section B. Thus it will be seen that the stool has been converted into a cane, as disclosed in Fig. 2, the sections B B' constituting the body or stem of the cane and the sleeve G the handle thereof. When I construct the parts so that they can be converted into a cane when not in use, I provide the lower end of section B' with a metallic ferrule, which when the device is used as a stool forms the pivot on which the upper section B of the stem A revolves.

The canvas seat F is preferably made triangular in shape, and is provided at each corner with a metal bail $f$, which latter is inserted in the slots $e$ formed in the ends of tines D. Slots $e$ are formed of a narrow slit $e'$ cut in the end of the tine communicates with an enlarged opening $e^2$. The bail $f$ is constructed of sheet metal and is greater in its width than in thickness. It is provided with a notch $e^3$ having comparatively wide side walls $e^4$, $e^4$. The bail on being placed parallel into the slit $e'$ can be readily inserted therein and when turned at right angles to the tine in which position it is turned when the seat is in use, it is securely locked within the opening $e^2$, and is retained against longitudinal displacement by means of the shoulders or side walls $e^4$ $e^4$ engaging the sides of the tine. When it is desired to fold the seat, the bails are turned parallel with the tines and hence may be folded with the seat into small compass.

In the form shown in Fig. 3, the stem or standard A is a cylindrical hollow tube, preferably made in one piece, while I I' are metal plugs adapted to fit into the open ends of the stem or standard A. The plugs I I' are each provided with a shoulder $f'$, which latter abuts against the ends of stem A and holds the plugs in position. The plugs I I' are also provided with screw threads for engagement with the internally screw threaded sockets or sleeves C C', which latter are provided with a series of slots $a$, through which project the tines D and D'. The tines D are constructed as heretofore described and are held in their open position by screwing the plug I into the sleeve or socket until the concaved end of said plug bears against the lower surface of that portion of the tines D contained within the socket. The tines D' are held in their open or horizontal position by the plug I', which latter is screwed into the sleeve or socket C' until the former comes in contact with the upper surface of the tines D'. The tines D and D' now being in their open or operative positions, the camp stool is quickly formed by inserting the plugs I I' into the ends of the stem or standard A. To fold the stool as above described it is only necessary to withdraw the plug I, unscrew the latter from the socket C a sufficient distance to admit of the tines D and canvas seat F to be folded in an upright position, after which insert the folded portion into the stem or body A. The plug I' is also withdrawn and the tines D' folded and finally inserted within the stem or standard A.

It is evident that changes in the construction and relative arrangement of the several parts might be made without avoiding my invention and hence I would have it understood that I do not restrict myself to the particular construction and arrangement of parts shown and described, but, Having fully described my invention, what I claim as new, and desire to secure by Letters Patent, is—

1. In a folding stool, the combination with a standard, of a hollow socket or ferrule adapted to be secured to the standard, said socket or ferrule provided with slots in its closed end, tines passed through these slots, said tines provided with shoulders or enlargements which bear outwardly against the inner walls of the socket or ferrule and beveled inner ends adapted to interlock and constitute keys for each other when the tines are spread outward, substantially as set forth.

2. In a folding stool, the combination with an upper section provided with a folding seat, of a lower section the upper end of which is adapted to fit within the lower end of the upper section, and form therewith the body of a cane, said lower section being provided at one end with a folding base, the parts being so constructed that the position of the lower section may be reversed and nearly its entire length inserted within the upper section and constitute a stem or standard on which the upper section may rotate, substantially as set forth.

3. In a folding stool, a standard or support made in two telescopic sections capable of being separated, one section hollow and closed at the upper end and the other section reversible and adapted to enter the hollow section and bear at one end upon the closed end of the hollow section whereby the upper section is rendered capable of turning upon the lower section, substantially as set forth.

In testimony whereof I have signed this specification, in the presence of two subscribing witnesses.

SAMUEL E. REUTTER.

Witnesses:
C. S. DRURY,
GEO. F. DOWNING.